United States Patent
Nohara et al.

(10) Patent No.: US 6,806,303 B2
(45) Date of Patent: Oct. 19, 2004

(54) ADDITIVE FOR RUBBER COMPOSITION, ADDITIVE COMPOSITION FOR RUBBER COMPOSITION, RUBBER COMPOSITION AND TIRE

(75) Inventors: Daisuke Nohara, Kodaira (JP); Jingo Shirasaka, Kodaira (JP); Isao Nishi, Wakayama (JP); Masaaki Tsuchihashi, Wakayama (JP); Tetsuo Takano, Wakayama (JP)

(73) Assignees: Bridgestone Corporation, Tokyo (JP); Kao Corporation, Tokyo (JP)

( * ) Notice: Subject to any disclaimer, the term of this patent is extended or adjusted under 35 U.S.C. 154(b) by 181 days.

(21) Appl. No.: 09/923,533

(22) Filed: Aug. 8, 2001

(65) Prior Publication Data

US 2002/0042462 A1 Apr. 11, 2002

(30) Foreign Application Priority Data

Aug. 8, 2000 (JP) ........................ 2000-239503
Dec. 27, 2000 (JP) ........................ 2000-397565

(51) Int. Cl.$^7$ ................................. C08K 5/12
(52) U.S. Cl. ........................ 524/287; 524/495; 524/496; 524/493; 524/292
(58) Field of Search ................................. 524/495, 496, 524/493, 287, 288, 289, 290, 291, 292, 293, 294, 295, 296, 297, 298, 299, 300, 284; 525/332.5

(56) References Cited

U.S. PATENT DOCUMENTS 6,008,304 A * 12/1999 Nohara et al. ............ 525/332.5
6,207,283 B1 * 3/2001 Bell et al. ................ 428/411.1

FOREIGN PATENT DOCUMENTS

| EP | 0 867 468 A1 | | 9/1998 |
|---|---|---|---|
| EP | 0 869 145 A1 | | 10/1998 |
| EP | 1 026 196 A2 | | 8/2000 |
| JP | 4-20579 | | 1/1992 |
| JP | 04-020579 | * | 1/1992 |
| JP | 6-57040 | | 3/1994 |
| JP | 06-118648 | * | 4/1994 |
| JP | 11-209406 | | 8/1999 |
| JP | 2003119318 | * | 4/2003 |
| JP | 2003119319 | * | 4/2003 |
| JP | 2003268098 | * | 9/2003 |

* cited by examiner

Primary Examiner—Katarzyna Wyrozebski
(74) Attorney, Agent, or Firm—Sughrue Mion, PLLC

(57) ABSTRACT

An additive for a rubber composition consists essentially of an ester of (i) an aliphatic polyvalent carboxylic acid with (iii) a (poly)oxyalkylene derivative, and having at least one carboxyl group in its molecule, or an ester of (ii) an aromatic polyvalent carboxylic acid with (iii) a (poly)oxyalkylene derivative, and having at least one carboxyl group bonded to an aromatic ring in its molecule. And also, it relates to an additive composition, a rubber composition and a pneumatic tire using such an additive for a rubber composition.

19 Claims, No Drawings

ADDITIVE FOR RUBBER COMPOSITION, ADDITIVE COMPOSITION FOR RUBBER COMPOSITION, RUBBER COMPOSITION AND TIRE

BACKGROUND OF THE INVENTION

1. Field of the Invention

This invention relates to an additive for a rubber composition and an additive composition for a rubber composition capable of improving a processability and productivity in the production of rubber articles without badly affecting properties of an uncured rubber and of a cured rubber as well as a rubber composition and a pneumatic tire using the same.

2. Description of Related Art

In the production of rubber articles such as tires, belts, hoses and the like, kneading of a rubber composition is generally conducted in order for uniformly dispersing compounding ingredients and filler into starting rubber. And also, it is required to further conduct rubber milling for plasticizing the rubber composition several times in order to facilitate building operability at subsequent rubber processing step. However, such a repetition of the plasticizing operation is unfavorable in view of the productivity of the rubber article. On the other hand, although it is effective to decrease the rubber milling number in order to improve the productivity of the rubber article, the uncured rubber composition is not sufficiently plasticized when the rubber milling number is merely decreased, which does not ultimately link to the improvement of the productivity.

To this end, it is possible to improve the processability of an uncured rubber composition by adding a plasticizer, a processing aid or the like. Then, the building operability can be improved while decreasing the rubber milling number. In case of using a conventional plasticizer, a processing aid and the like, however, the degradation of properties of the uncured rubber composition or the cured rubber composition is caused and it is actually difficult to decrease the rubber milling number. At the processing step in the production of the rubber article including natural rubber is particularly existent a polymer gel formed by entanglement of natural rubber molecular chains with each other, or by reaction of functional groups in isoprene chain of natural rubber with each other, or by reaction of such a functional group with non-rubber ingredient in natural rubber, so that the rubber milling number increases and the degradation of the building operability is accompanied therewith. And also, if the rubber milling number is increased for plasticizing an uncured rubber composition, the lowering of molecular weight in natural rubber is caused, which badly affects the properties of the cured rubber composition.

Therefore, it is demanded to improve the building operability without degrading the properties of the uncured rubber composition or the cured rubber composition in the production of the rubber article particularly including natural rubber since early times.

In order to solve these problems, there are recently proposed some attempts. For instance, JP-A-11-209406 discloses that a quantity of polymer gel in natural rubber is decreased by adding an aromatic polycarboxylic acid derivative to natural rubber. According to this method, however, it has been confirmed that blooming is apt to be easily caused in the cured rubber.

And also, JP-A-6-57040 and JP-A-4-20579 disclose that the processability is improved by adding a specified ester. According to these methods, however, peculiar odor is generated in the processing, which becomes a problem in view of the operating environment.

SUMMARY OF THE INVENTION

It is, therefore, an object of the invention to solve the aforementioned problems of the conventional techniques and to provide an additive for a rubber composition and an additive composition for a rubber composition both being capable of improving the processability without degrading the properties of the rubber composition. It is another object of the invention to solve the problem in view of the operating environment and particularly decreasing the quantity of polymer gel in a rubber composition including natural rubber without lowering the molecular weight of natural rubber to thereby improve the processability and the productivity and stabilize surface states of both uncured and cured rubber compositions as well as a rubber composition and a pneumatic tire using the same.

The inventors have discovered that slippage between rubber molecules is increased by using a partial ester between a specified aliphatic or aromatic polyvalent carboxylic acid and a (poly)oxyalkylene derivative as an additive for a rubber composition without degrading the properties of a cured rubber composition and as a result the invention has been accomplished.

According to a first aspect of the invention, there is the provision of an additive for a rubber composition consisting essentially of an ester selected from an ester of (i) an aliphatic polyvalent carboxylic acid with (iii) a (poly)oxyalkylene derivative, and having at least one carboxyl group in its molecule, and an ester of (ii) an aromatic polyvalent carboxylic acid with (iii) a (poly)oxyalkylene derivative, and having at least one carboxyl group bonded to an aromatic ring in its molecule.

According to a second aspect of the invention, there is the provision of an additive composition for a rubber composition comprising (a) a reinforcing filler and (b) an ester selected from an ester of (i) an aliphatic polyvalent carboxylic acid with (iii) a (poly)oxyalkylene derivative, and having at least one carboxyl group in its molecule, and an ester of (ii) an aromatic polyvalent carboxylic acid with (iii) a (poly)oxyalkylene derivative, and having at least one carboxyl group bonded to an aromatic ring in its molecule, in which a compounding ratio by weight of the component (a) to the component (b) is 70/30 to 30/70.

According to a third aspect of the invention, there is the provision of a rubber composition comprising a rubber ingredient and an ester selected from an ester of (i) an aliphatic polyvalent carboxylic acid with (iii) a (poly)oxyalkylene derivative, and having at least one carboxyl group in its molecule, and an ester of (ii) an aromatic polyvalent carboxylic acid with (iii) a (poly)oxyalkylene derivative, and having at least one carboxyl group bonded to an aromatic ring in its molecule.

According to a fourth aspect of the invention, there is the provision of a rubber composition comprising (A) a rubber ingredient and (B) an additive composition for a rubber composition consisting of (a) a reinforcing filler and (b) an ester selected from an ester of an aliphatic polyvalent carboxylic acid with a (poly)oxyalkylene derivative, and having at least one carboxyl group in its molecule, and an ester of an aromatic polyvalent carboxylic acid with a (poly)oxyalkylene derivative, and having at least one carboxyl group bonded to an aromatic ring in its molecule.

According to a fifth aspect of the invention, there is the provision of a pneumatic tire characterized by using a rubber composition defined in any one of the third and fourth aspects of the invention.

DETAILED DESCRIPTION OF THE INVENTION

The additive for a rubber composition according to the invention is an ester of an aliphatic polyvalent carboxylic acid with a (poly)oxyalkylene derivative, and having at least one carboxyl group in its molecule, or an ester of an aromatic polyvalent carboxylic acid with a (poly) oxyalkylene derivative, and having at least one carboxyl group bonded to an aromatic ring in its molecule.

The former ester is preferable to be represented by the following formula

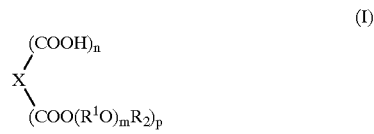

(I)

(wherein m is a number of not less than 1 indicating an average degree of polymerization, and each of n and p is an integer of not less than 1, and X is a saturated or unsaturated aliphatic chain, and $R^1$ is an alkylene group, and $R^2$ is a hydrocarbon group selected for the group consisting of an alkyl group, an alkenyl group, an alkylaryl group and an acyl group).

In the formula (I), it is favorable that X is an aliphatic chain having an unsaturated bond, and n=1 and p=1, and $R^1$ is an alkylene group having a carbon number of 2–4, and $R^2$ is an alkyl group or an alkenyl group having a carbon number of 2–28. More preferably, X is an aliphatic chain having an unsaturated bond and a carbon number of 2–8, and m is 1–10, and $R^1$ is an ethylene group or a propylene group, and $R^2$ is an alkyl group or an alkenyl group having a carbon number of 8–18.

The latter ester is preferable to be represented by the following formula (II):

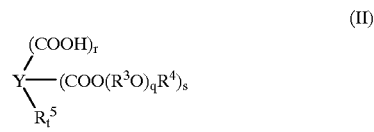

(II)

(wherein q is a number of not less than 1 indicating an average degree of polymerization, and each of r and s is an integer of not less than 1, and t is 0 or an integer of not less than 1, and r+t+s is 6–8, and Y is an aromatic ring, and $R^3$ is an alkylene group, $R^4$ is a hydrocarbon group selected from the group consisting of an alkyl group, an alkenyl group, an alkylaryl group and an acyl group, and $R^5$ is a hydrogen atom, an alkyl group or an alkenyl group).

In the formula (II), it is favorable that r+s is 2 or 3, and $R^3$ is an alkylene group having a carbon number of 2–4, and $R^4$ is an alkyl group or an alkenyl group having a carbon number of 2–28. More preferably, Y is a benzene ring, and r=1 and s=1, and $R^3$ is an ethylene group, and $R^4$ is an alkyl group or an alkenyl group having a carbon number of 2–28. Most preferably, q is 1–10, r=1, s=1, $R^3$ is an ethylene group and $R^4$ is an alkyl group or an alkenyl group having a carbon number of 8–18.

The additive for a rubber composition according to the invention is obtained by reacting (i) an aliphatic polyvalent carboxylic acid, in another word a bivalent or more aliphatic carboxylic acid or anhydride thereof, or (ii) an aromatic polyvalent carboxylic acid, in another word, a bivalent or more aromatic carboxylic acid or anhydride thereof with (iii) a (poly)oxyalkylene derivative.

As the polyvalent aliphatic carboxylic acid or the anhydride thereof (i), mention may be made of saturated aliphatic bivalent carboxylic acids such as succinic acid, succinic anhydride, gultaric acid, adipic acid, sebacic acid and the like; unsaturated aliphatic bivalent carboxylic acids such as maleic acid, maleic anhydride, fumaric acid, itaconic acid, itaconic anhydride, citraconic acid, citraconic anhydride, alkenylsuccinic acid, alkenylsuccinic anhydride and the like; aliphatic trivalent carboxylic acid such as maleinized aliphatic acid or the like; and so on. As the component (i), bivalent carboxylic acid having an unsaturated bond or an anhydride thereof is favorable, and a maleic anhydride is most favorable. These polyvalent aliphatic carboxylic acids and anhydrides thereof may be used alone or in admixture of tow or more.

As the polyvalent aromatic carboxylic acid (ii), mention may be made of bivalent aromatic carboxylic acids and their anhydrides such as phthalic acid, anhydrous phthalic acid, naphthalene dicarboxylic acid and the like; trivalent aromatic carboxylic acids and their anhydrides such as trimellitic acid, anhydrous trimellitic acid and the like; tetravalent aromatic carboxylic acids and their anhydrides such as pyromellitic acid, anhydrous pyromellitic acid and the like; and so on. As the component (ii), bivalent or trivalent aromatic acids and anhydrides thereof are favorable in view of the cost, and anhydrous phthalic acid is particularly favorable. These polyvalent aromatic carboxylic acids and anhydrides thereof may be used alone or in admixture of two or more.

As the (poly)oxyalkylene derivative (iii), mention may be made of compounds having a (poly)oxyalkylene group with an average polymerization degree of not less than 1, and having one or more hydroxyl groups, preferably compounds having a (poly)oxyalkylene group with one or two hydroxyl groups, more particularly compounds having a (poly) oxyalkylene group and one hydroxyl group. As the component (iii), mention may be made of ether-type derivatives such as (poly)oxyalkylene alkyl ether and the like; ester-type derivatives such as (poly)oxyalkylene aliphatic acid monoester and the like; ether ester-type derivatives such as (poly)oxyalkylene glycerine aliphatic acid ester and the like; nitrogen-containing derivatives such as (poly)oxyalkylene aliphatic acid amide, (poly)oxyalkylene alkylamine and the like; and so on. Among them, the ether-type and ester-type derivatives are favorable, and the ether-type derivatives are particularly favorable.

As the ether-type (poly)oxyalkylene derivative, mention may be made of polyoxyalkylene aliphatic ethers such as polyoxyethylene lauryl ether, polyoxy-ethylene decyl ether, polyoxyethylene octyl ether, polyoxyethylene 2-ethylhexyl ether, polyoxyethylene polyoxypropylene lauryl ether, polyoxypropylene stearyl ether, polyoxyethylene oleyl ether and the like; polyoxyethylene aromatic ethers such as polyoxyethylene benzyl ether, polyoxyethylene alkylphenyl ether, polyoxyethylene benzylated phenyl ether and the like; and so on. Among them, the polyoxyalkylene aliphatic ether is favorable.

Further, polyoxyethylene alkyl or alkenyl ether is preferable. In this case, it is favorable that an average polymerization degree of polyoxyethylene is 1–10 and a carbon number of alkyl or alkenyl group is 8–18. Concretely, when polyoxyethylene is abbreviated as POE(n) wherein n is an average polymerization degree, there are mentioned POE(3) octyl ether, POE(4) 2-ethylhexyl ether, POE(3) decyl ether, POE(5) decyl ether, POE(3) lauryl ether, POE(8) lauryl ether, POE(1) stearyl ether and so on.

Moreover, the above (poly)oxyalkylene derivatives may be used alone or in admixture of two or more.

In the ester of the component (i) and the component (iii) according to the invention, the component (i) as a starting material may be included in an amount of not more than 10% by weight, preferably not more than 5% by weight, or the component (iii) as a starting material may be included in an amount of not more than 40% by weight, preferably not more than 20% by weight. As such an ester, mention may be made of mono(POE(3) lauryl ether) maleic acid ester, mono(POE(3) 2-ethylhexyl ether) maleic acid ester and so on.

The additive composition for a rubber composition according to the invention comprises (a) a reinforcing filler and (b) an ester selected from an ester of (i) an aliphatic polyvalent carboxylic acid with (iii) a (poly)oxyalkylene derivative, and having at least one carboxyl group in its molecule, and an ester of (ii) an aromatic polyvalent carboxylic acid with (iii) a (poly)oxyalkylene derivative, and having at least one carboxyl group bonded to an aromatic ring in its molecule, in which a compounding ratio by weight of the component (a) to the component (b) is preferable to be 70/30 to 30/70 in view of the operability. When the compounding ratio is less than 30/70, the handling may become difficult, while when it exceeds 70/30, the improvement of the operability may not be satisfactorily obtained. In this point, the compounding ratio by weight is more preferable to be within a range of 60/40 to 40/60.

The reinforcing filler as the component (a) is not particularly restricted, but is favorable to be carbon black, inorganic fillers, such as silica, aluminum hydroxide, talc, clay and the like. Among them, carbon black, silica and aluminum hydroxide are preferable. Especially, as a carbon black, HAF, ISAF and SAF are preferable, while silica is preferable to have an $N_2SA$ (nitrogen adsorption specific surface area) of 50–250 $m^2/g$ and a DBP (dibutyl phthalate absorption) of 150–300 ml/100 g.

Further, the additive composition for a rubber composition according to the invention may contain at least one compound selected from (poly)oxyalkylene derivatives, alcohols and aliphatic esters as a component (c). In this case, a compounding amount of the component (c) is preferable to be not more than 10 parts by weight per 100 parts by weight of total amount of the components (a) and (b). When the compounding amount exceeds 10 parts by weight, merits by the addition of a large amount of the component (c) are not substantially obtained. These compounds may be used alone or in admixture of two or more as the component (c).

The component (c) is favorable to have a melting point of not higher than 20° C. and a boiling point of not lower than 150° C. When the melting point exceeds 20° C., it is difficult to control powdery dust in the production of the additive composition or a rubber composition using the same, while when the boiling point is lower than 150° C., the safeness in the rubber processing can not be sufficiently ensured.

The (poly)oxyalkylene derivative as the component (c) includes derivatives of ether-type, ester-type, ether ester-type, nitrogen containing-type and so on likewise the above component (iii). Among them, ether-type or ester-type polyoxyalkylene derivative is favorable. Particularly, polyoxyethylene derivatives are preferable. Concretely, when polyoxyethylene is abbreviated as POE(n) and n is an average polymerization degree, there are mentioned POE(3) lauryl ether, POE(5) decyl ether, POE(4) oleyl ether, POE(10) monolaurate, POE(10) monooleate, ethylene glycol dioleate, POE(9) dicaprylate and so on.

The alcohol as the component (c) is not particularly restricted, but it is preferable to be an aliphatic alcohol having a carbon number of 8–20. For example, there are mentioned octyl alcohol, 2-ethylhexyl alcohol, decyl alcohol, lauryl alcohol, oleyl alcohol, stearyl alcohol, ethylene glycol, capryl alcohol and so on. And also, esters of these alcohols are preferably used as the aliphatic ester as the component (c).

The additive composition for a rubber composition according to the invention is obtained by merely mixing the above components in a mixer. As the mixer, mention may be made of a Henschel mixer, a Nauta mixer (trade name, made by Hosokawa Micron Co., Ltd.), a tumbler mixer and so on. The mixing may be carried out by selecting revolution number, agitating temperature, agitating time and the like within optimum ranges in accordance with the kind of the mixer used and the ingredient to be mixed.

The first rubber composition according to the invention is obtained by compounding a rubber ingredient with the additive for a rubber composition as previously mentioned, i.e. the ester of (i) an aliphatic polyvalent carboxylic acid with (iii) a (poly)oxyalkylene derivative, and having at least one carboxyl group in its molecule, or the ester of (ii) an aromatic polyvalent carboxylic acid with (iii) a (poly) oxyalkylene derivative, and having at least one carboxyl group bonded to an aromatic ring in its molecule. If necessary, a reinforcing filler similar to those previously described may be compounded. As the reinforcing filler, carbon black, silica and aluminum hydroxide are favorable.

In this case, it if favorable that the compounding amount of the reinforcing filler is 10–85 parts by weight per 100 parts by weight of the rubber ingredient. And also, it is favorable that the compounding amount of the ester is 0.1–10 parts by weight, preferably 0.5–5 parts by weight per 100 parts by weight of the rubber ingredient. When the amount of the ester is not less than 0.1 part by weight, the processability is improved, while when it is not more than 10 parts by weight, the rubber properties are held and the cost becomes desirable.

The second rubber composition according to the invention is obtained by compounding (A) a rubber ingredient with (B) the additive composition for a rubber composition as previously mentioned, i.e. the additive composition consisting of (a) the reinforcing filler and (b) the ester of an aliphatic polyvalent carboxylic acid with a (poly)oxyalkylene derivative, and having at least one carboxyl group in its molecule, or the ester of an aromatic polyvalent carboxylic acid with a (poly)oxyalkylene derivative, and having at least one carboxyl group bonded to an aromatic ring in its molecule. If necessary, at least one of a (poly)oxyalkylene derivative, an alcohol and an aliphatic acid ester thereof may be compounded.

In the component (B) used in the above second rubber composition, the compounding ratio by weight of the component (a) to the component (b) is 70/30–30/70, preferably 60/40–40/60. And also, the compounding amount of the component (B) in the second rubber composition is 0.1–10 parts by weight, preferably 0.5–5 parts by weight per 100 parts by weight of the rubber ingredient.

In any case, the rubber composition is obtained, for example, by kneading the above components to be compounded.

When the rubber ingredient includes natural rubber, the rubber compositions according to the invention can reduce a polymer gel quantity of natural rubber without decreasing the molecular weight of natural rubber and increases the slippage between rubber molecules to improve the building operability and control the degradation of the properties in the uncured and cured rubber compositions. On the other hand, when the rubber ingredient does not include natural rubber, the slippage between rubber molecules is increased to improve the building operability and also the decrease in molecular weight of rubber component is not caused and hence the degradation of the properties in the uncured and cured rubber compositions is not caused. In any case, according to the invention, the excellent rubber processability can be obtained without badly affecting the properties of either uncured or cured rubber composition.

The rubber ingredient used in the rubber compositions according to the invention is not particularly restricted, but is favorable to be natural rubber alone or a blend of natural rubber and synthetic rubber(s). As the synthetic rubber, mention may be made of styrene-butadiene rubber (SBR), butadiene rubber (BR), isoprene rubber (IR), butyl rubber (IIR), halogenated butyl rubber (X-IIR), ethylene-propylene-diene terpolymer rubber (EPDM) and a mixture thereof.

As the reinforcing filler used in the rubber composition, use may be made of carbon blacks of HAF, ISAF, SAF and the like, inorganic fillers such as silica, aluminum hydroxide, clay talc and so on as previously mentioned. They may be used alone or in admixture of two or more. Moreover, when an inorganic filler is compounded in the rubber composition, the dispersion improving effect through the inorganic filler is obtained, and such an effect becomes remarkable as the silica content increases.

Furthermore, the rubber composition according to the invention may properly be compounded with the other additives usually used in the lubber field such as sulfur, vulcanization accelerator, processing oil, antioxidant and so on, if necessary.

The rubber composition according to the invention is obtained by kneading the aforementioned components in a kneading machine such as rolls, internal mixer or the like and subjected to a given building process, which can be applied to not only application of tire member such as tread, under tread, carcass, sidewall, bead portion or the like but also application of the other industrial goods such as rubber vibration isolator, belt, hose and the like. Preferably, the above rubber composition is used as a rubber for tire tread.

The pneumatic tire according to the invention is manufactured by using the above rubber composition according to usual manner. That is, the rubber composition according to the invention containing, if necessary, various chemicals is extruded into various members for the tire at an uncured stage and shaped into a green tire on a tire building machine according to the usual manner. This green tire is heated under pressure in a vulcanizing machine to form a given tire. In the thus obtained tire, the rubber properties are not degraded, and also the productivity is excellent because the processability of the rubber composition is good. Moreover, the tire according to the invention can be used by filling a gas such as air, nitrogen or the like in the inside of the tire.

The following examples are given in illustration of the invention and are not intended as limitations thereof.

Various measurements in the examples are carried out by the following methods.

Mooney viscosity ($ML_{1+4}$)

As an evaluation of processability of a rubber composition, an uncured rubber sample compounded and kneaded with a vulcanizing system is preheated at 130° C. for 1 minute and a rotor is rotated for 4 minutes to measure a Mooney viscosity by using a Mooney viscometer SMV201 made by Shimadzu Seisakusho. The measured value is represented by an index on the basis that Comparative Example 1, 2 or 3 is 100. The larger the index value, the better the processability.

Mooney scotch time

As an evaluation of processing stability of a rubber composition, an uncured rubber sample compounded and kneaded with a vulcanizing system is preheated at 130° C. for 1 minute by using the same apparatus as used in the measurement of the Mooney viscosity and then a time taken for a rise in Mooney viscosity by 5 units from a minimum value Vm at the start of preheating is measured according to JIS K6300-1994. The measured value is represented by an index on the basis that Comparative Example 3 is 100. The smaller the index value, the better the processing stability.

Vulcanizing property (T90)

As an evaluation of adequate vulcanizing property of a rubber composition, a value of 90% vulcanizing time (T90) is measured at 150° C. according to vibration type vulcanization test of JIS K6300-1994. The measured value is represented by an index on the basis that Comparative Example 3 is 100. The smaller the index value, the shorter the vulcanizing time and the better the vulcanization productivity.

Odor

An odor felt in weighing and in kneading is evaluated by 10 workers according to the following standard:

○: all of 10 workers do not feel odor
Δ: 1–9 workers feel some odor
X: all of 10 workers feel odor Tensile strength at break, Elongation at break The tensile strength at break and elongation at break are measured by using a dumbbell No. 3 specimen according to a test method of JIS K6251-1993. The measured values are represented by an index on the basis that Comparative Example 1, 2, 3 or 11 is 100. The larger the index value, the larger the tensile strength at break and the elongation at break.

Rebound resilience

A given weight is freely dropped from a given height onto a surface of cured sample to measure a jumping height of the weight (percentage to the original height) according to a test method of JIS K6301-1995. The measured value is represented by an index on the basis that Comparative Example 1, 2, 3 or 11 is 100. The larger the index value, the larger the rebound resilience.

Wear resistance

A worn quantity is measured by means of a Lambourn abrasion tester according to JIS K6264-1993. The measured value is represented by an index on the basis that Comparative Example 1, 2, 3 or 11 is 100. The larger the index value, the better the wear resistance.

Examples 1–7, Comparative Example 1

In a Banbury mixer are kneaded 100 parts by weight of natural rubber (RSS#3), an ester as a component (b) of an amount per 100 parts by weight of rubber ingredient shown in Table 1 and a kind shown in Table 2, 55 parts by weight of carbon black HAF, 2 parts by weight of stearic acid, 1 part by weight of an antioxidant, 6PPD (N-phenyl-N'-(1,3-dimethylbutyl)-p-phenylene diamine) and 1 part by weight of a wax at a starting temperature of 70° C. and a revolution number of 70 rpm for 4 minutes. After the resulting mixture is sufficiently cooled in air at room temperature, it is further kneaded with 3 parts by weight of zinc white, 1 part by weight of a vulcanization accelerator, DM (dibenzothiazyl disulfide), 1 part by weight of a vulcanization accelerator, CBS (N'-dicyclohexyl-2-benzothiazyl sulfenamide) and 2 parts by weight of sulfur at a starting temperature of 70° C. and a revolution number of 70 rpm in a Banbury mixer for 1 minute. Moreover, an ester as the component (b) is not used in Comparative Example 1.

The Mooney viscosity is measured with respect to the resulting uncured rubber compositions. And also, such an uncured rubber composition is cured at 150° C. for 30 minutes and then the tensile strength at break, elongation at break, rebound resilience and wear resistance are measured with respect to the resulting cured rubber to obtain results as shown in Table 1. Comparative Example 1 is the control in all the properties for all of Examples 1 to 7.

TABLE 1

|  | Example 1 | Example 2 | Example 3 | Example 4 | Example 5 | Example 6 | Example 7 | Comparative Example 1 |
|---|---|---|---|---|---|---|---|---|
| Kind of component (b) | A | A | A | A | A | B | C | none |
| Amount of component (b) (phr) | 0.05 | 0.3 | 3 | 8 | 15 | 3 | 3 | — |
| Mooney viscosity | 106 | 110 | 115 | 118 | 121 | 114 | 113 | 100 |
| Tensile strength at break | 101 | 99 | 100 | 98 | 98 | 101 | 99 | 100 |
| Elongation at break | 102 | 102 | 98 | 99 | 100 | 98 | 98 | 100 |
| Rebound resilience | 98 | 99 | 98 | 98 | 97 | 99 | 99 | 100 |
| Wear resistance | 98 | 97 | 99 | 100 | 98 | 97 | 99 | 100 |

Presence or absence of blooming

After a cured rubber specimen after the vulcanization is left to stand in an atmosphere of 5° C. for 12 weeks, toluene-soluble matter on the surface of the specimen is analyzed by means of a gas chromatograph and a mass spectrometer to measure presence or absence of a substance precipitated from an additive composition for a rubber composition or resulted from such an additive composition. Moreover, the measuring conditions in the gas chromatograph are that an injection temperature is 280° C., and a column is held at 70° C. for 1 minute and heated up to 300° C. at a rate of 25° C./min and held at 300° C. for 10 minutes, and helium is used as a carrier gas and a flow rate of the carrier gas is 1 ml/min, while the measuring condition in the mass spectrometer is that a scanning range is M/Z:25–500. As a result, the presence or absence of blooming is evaluated as follows.

○: the precipitation of the substance is not confirmed
X: the precipitation of the substance is confirmed As the ester of the component (b) are used compounds A, B and C having the following formula (III):

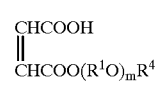

(III)

wherein m, $R^1$ and $R^2$ are shown in Table 2.

TABLE 2

| Compound | m | $R^1$ | $R^2$ | Name |
|---|---|---|---|---|
| A | 3 | ethylene group | lauryl group | mono(POE(3) laurylether) maleic acid ester |
| B | 3 | propylene group | lauryl group | mono(POP(3) laurylether) maleic acid ester |

TABLE 2-continued

| Compound | m | R¹ | R² | Name |
|---|---|---|---|---|
| C | 3 | ethylene group | 2-ethylhexyl group | mono(POE(3)2-ethylhexyl ether) maleic acid ester |

Examples 8–14, Comparative Example 2

An additive composition (B) for a rubber composition is previously prepared by mixing a component (b) of kind and amount shown in Table 3 with silica (Nipsil VN3, trade name, made by Nippon Silica Kogyo Co., Ltd.) at a mixing ratio of component (b):silica=6:4.

In a Banbury mixer are kneaded 100 parts by weight of styrene-butadiene copolymer rubber (137.5 parts by weight of SBR1712, trade name, made by JSR Corporation, an oil-extended rubber containing 37.5 phr of aromatic oil), the above prepared additive composition, 30 parts by weight of carbon black ISAF, 30 parts by weight in total of silica (the same as silica used in the preparation of the additive composition), 1 part by weight of stearic acid, 1 part by weight of an antioxidant, 6PPD (N-phenyl-N'-(1,3-dimethylbutyl)-p-phenylene diamine), 1 part by weight of a wax and 3 parts by weight of a silane coupling agent (Si69, trade name, made by Degussa AG) at a starting temperature of 70° C. and a revolution number of 70 rpm for 4 minutes.

After the resulting mixture is sufficiently cooled in air at room temperature, it is further kneaded with 3 parts by weight of zinc white, 1 part by weight of a vulcanization accelerator, DM (dibenzothiazyl disulfide), 1 part by weight of a vulcanization accelerator, D (diphenyl guanidine), 1 part by weight of a vulcanization accelerator, CBS (N-cyclohexyl-2-benzothiazyl sulfenamide) and 2 parts by weight of sulfur at a starting temperature of 70° C. and a revolution number of 70 rpm in a Banbury mixer for 1 minute. Moreover, an ester as the component (b) is not used in Comparative Example 2.

The Mooney viscosity is measured with respect to the resulting uncured rubber composition. And also, such an uncured rubber composition is cured at 150° C. for 30 minutes and then the strength at break, elongation at break, rebound resilience and wear resistance are measured with respect to the resulting cured rubber to obtain results as shown in Table 3. Comparative Example 2 is the control in all the properties for all of Examples 8 to 14.

As seen from the results of Tables 1 and 3, all of the rubber compositions according to the invention are considerably excellent in the processability of uncured rubber and maintain good properties of cured rubber without substantially degrading them.

In the following examples and comparative example, a compound represented by the following formula (IV):

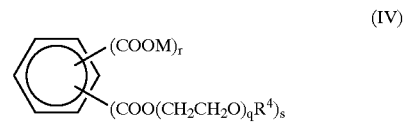

(IV)

(wherein q, r, s, M, and $R^4$ are shown in Table 4) is used as an additive for a rubber composition.

TABLE 4

| Carboxylic acid derivative | q | r | s | Kind of M | Kind of $R^4$ |
|---|---|---|---|---|---|
| Additive for rubber composition | | | | | |
| For Examples | | | | | |
| I | 3 | 1 | 1 | H | lauryl |
| II | 3 | 1 | 1 | H | decyl |
| III | 4 | 1 | 1 | H | 2-ethylhexyl |
| IV | 4 | 1 | 1 | H | oleyl |
| V | 6 | 1 | 1 | H | stearyl |
| VI | 6 | 2 | 1 | H | stearyl |
| VII | 1 | 2 | 1 | H | 2-ethylhexyl |
| VIII | 12 | 2 | 1 | H | octyl |
| For Comparative Examples | | | | | |
| IX | 3 | 0 | 2 | — | lauryl |
| X | 0 | 1 | 1 | H | stearyl |

TABLE 3

| | Example 8 | Example 9 | Example 10 | Example 11 | Example 12 | Example 13 | Example 14 | Comparative Example 2 |
|---|---|---|---|---|---|---|---|---|
| Kind of component (b) | A | A | A | A | A | B | C | none |
| Amount of component (b) (phr) | 0.05 | 0.3 | 3 | 8 | 15 | 3 | 3 | — |
| Mooney viscosity | 104 | 108 | 114 | 116 | 119 | 113 | 113 | 100 |
| Tensile strength at break | 101 | 100 | 99 | 98 | 99 | 100 | 99 | 100 |
| Elongation at break | 102 | 103 | 97 | 99 | 102 | 96 | 99 | 100 |
| Rebound resilience | 98 | 100 | 97 | 98 | 98 | 98 | 98 | 100 |
| Wear resistance | 98 | 98 | 98 | 100 | 100 | 95 | 99 | 100 |

TABLE 4-continued

| Carboxylic acid derivative | q | r | s | Kind of M | Kind of R⁴ |
|---|---|---|---|---|---|
| XI | 0 | 1 | 1 | H | decyl |
| XII | 0 | 1 | 1 | H | oleyl |
| XIII | 3 | 1 | 1 | Zn | lauryl |

Examples 15–27, Comparative Examples 3–9

An uncured rubber composition is prepared by compounding 100 parts by weight of rubber ingredient shown in Table 5 with the kind and amount of the above additive for a rubber composition shown in Table 5, 50 parts by weight of carbon black ISAF, 2 parts by weight of stearic acid, 3 parts by weight of zinc white, 1 parts by weight of an antioxidant 6 PPD, 1.5 parts by weight of sulfur and 1 part by weight of a vulcanization accelerator CBS. The resulting uncured rubber composition is kneaded 3 times. Moreover, the kneading number in Comparative Example 3 is 4 times.

With respect to the thus obtained uncured rubber composition, the processability (Mooney viscosity), processing stability (Mooney scorch time), vulcanizing property (T90) and odor are evaluated to obtain results as shown in Table 5. Comparative Example 3 is set to be control in the properties for all of the examples and the comparative examples.

The rubber composition of Comparative Example 4 is poor in the processability as compared with the rubber composition of Comparative Example 3 having more of kneading number. On the contrary, when Examples 15–27 are compared with Comparative Example 3, the processability is improved even if the kneading number is decreased and the properties of the uncured rubber composition are maintained.

As seen from Examples 25 and 26, the invention is effective to the blend of natural rubber and synthetic rubber in addition to natural rubber alone.

In Comparative Examples 6–8, the kind of the additive for a rubber composition is an alkyl ester, but is not (poly) oxyalkylene ester as defined in the invention, so that the working environment is degraded due to the odor although the degradation of the properties of the uncured rubber are not caused as shown in Comparative Examples 7 and 8 or the blooming of cured rubber becomes large as shown in the following Comparative Examples 12 and 13. Further, Comparative Examples 5 and 9 in which all of carboxyl groups are changed into ester and/or metal salt do not exhibit the effect on the properties such as processability and the like, from which it is clear that carboxyl group is essential.

Production Examples 1–11 (Additive composition for a rubber composition)

An additive composition for a rubber composition is prepared by mixing silica, carbon black as a component (a) with an ester of an aromatic polyvalent carboxylic acid and

TABLE 5

| Uncured rubber | Rubber ingredient (A) | | Additive for rubber composition | | Number of kneading steps | Mooney viscosity | Mooney scorch time | Vulcanizing property T90 | Odor |
|---|---|---|---|---|---|---|---|---|---|
| | natural rubber parts by weight | SBR parts by weight | Kind | parts by weight | | | | | |
| Example 15 | 100 | 0 | I | 1 | 3 | 102 | 92 | 95 | ○ |
| Example 16 | 100 | 0 | I | 2 | 3 | 92 | 91 | 95 | ○ |
| Example 17 | 100 | 0 | I | 5 | 3 | 88 | 103 | 91 | ○ |
| Example 18 | 100 | 0 | II | 2 | 3 | 95 | 92 | 95 | ○ |
| Example 19 | 100 | 0 | III | 2 | 3 | 95 | 90 | 91 | ○ |
| Example 20 | 100 | 0 | IV | 2 | 3 | 99 | 99 | 98 | ○ |
| Example 21 | 100 | 0 | V | 2 | 3 | 101 | 100 | 98 | ○ |
| Example 22 | 100 | 0 | VI | 2 | 3 | 102 | 97 | 102 | ○ |
| Example 23 | 100 | 0 | VII | 2 | 3 | 100 | 96 | 95 | ○ |
| Example 24 | 100 | 0 | VIII | 2 | 3 | 99 | 95 | 98 | ○ |
| Example 25 | 50 | 50 | I | 2 | 3 | 99 | 99 | 98 | ○ |
| Example 26 | 50 | 50 | II | 2 | 3 | 100 | 98 | 97 | ○ |
| Example 27 | 100 | 0 | I | 0.5 | 3 | 105 | 97 | 98 | ○ |
| Comparative Example 3 | 100 | 0 | — | 0 | 4 | 100 | 100 | 100 | ○ |
| Comparative Example 4 | 100 | 0 | — | 0 | 3 | 108 | 97 | 97 | ○ |
| Comparative Example 5 | 100 | 0 | IX | 2 | 3 | 109 | 96 | 99 | ○ |
| Comparative Example 6 | 100 | 0 | X | 2 | 3 | 91 | 90 | 93 | ○ |
| Comparative Example 7 | 100 | 0 | XI | 2 | 3 | 94 | 92 | 93 | X |
| Comparative Example 8 | 100 | 0 | XII | 2 | 3 | 104 | 95 | 93 | X |
| Comparative Example 9 | 100 | 0 | XIII | 2 | 3 | 110 | 97 | 96 | ○ | a (poly)oxyalkylene derivative as a component (b) and a (poly)oxyalkylene derivative or a polyvalent alcohol aliphatic acid ester having a melting point of not higher than 20° C. and a boiling point of not lower than 150° C. as a component (c) according to a compounding recipe as shown in Table 6 in a Henschel mixer while stirring. The property of the resulting additive composition is also shown in Table 6.

Example 42

The same procedure as in Example 31 is repeated except that 25 parts by weight of carbon black and 25 parts by weight of silica are used instead of 50 parts by weight of carbon black in Example 31 and the same evaluations as in Example 31 are carried out to obtain results as shown in Table 7.

TABLE 6

| Production Example | Component (a) | | Component (b) | | Component (c) | | | Property |
| --- | --- | --- | --- | --- | --- | --- | --- | --- |
| | kind | parts by weight | kind | parts by weight | kind | melting point (° C.) | parts by weight | |
| 1 | silica | 30 | I | 70 | — | — | 0 | powder |
| 2 | silica | 40 | III | 60 | — | — | 0 | powder |
| 3 | silica | 35 | I | 65 | ethylene glycol oleate | −6 | 2 | granulated powder |
| 4 | silica | 45 | I | 55 | ethylene glycol oleate | −6 | 5 | granulated powder |
| 5 | silica | 60 | I | 40 | ethylene glycol oleate | −6 | 10 | granulated powder |
| 6 | silica | 45 | I | 55 | POE(3)lauryl ether | −2 | 5 | granulated powder |
| 7 | silica | 45 | I | 55 | POE(10)dicaprylate | 0 | 5 | granulated powder |
| 8 | silica | 45 | I | 55 | POE(10)monooleate | 0 | 5 | granulated powder |
| 9 | carbon black | 65 | I | 35 | — | — | 0 | powder |
| 10 | silica | 65 | II | 35 | ethylene glycol oleate | −6 | 5 | granulated powder |
| 11 | silica | 25 | I | 75 | — | — | 0 | clay-like |

The additive compositions of Production Examples 1–10 according to the invention are solid and are easy to handle Particularly, in the additive compositions of Production Examples 3–8, 10, since the component (c) is added, the powdery duct is hardly scattered because these compositions are rendered into the granulated powder being more advantageous in the handling. On the contrary, the additive composition of Production Example 11 is clay-like and difficult in the handling.

Examples 28–41

100 parts by weight of rubber ingredient shown in Table 7 is kneaded with the additive compositions of Production Examples 1–10 of kind and amount shown in Table 7 (compounding amount is shown as an amount of component (b) in the composition), 50 parts by weight of carbon black ISAE, 2 parts by weight of stearic acid, 3 parts by weight of zinc white and 1 part by weight of an antioxidant 6 PPD, and then 1.5 parts by weight of sulfur and 1 part by weight of a vulcanization accelerator CBS as a vulcanizing additive are added and then the kneading is carried out at the number shown in Table 7 to obtain a rubber composition.

With respect to the thus obtained rubber compositions, the Mooney viscosity (processability), Mooney scorch time, vulcanizing property and odor are evaluated to obtain results as shown in Table 7.

TABLE 7

| Uncured rubber | Rubber ingredient (A) | | Additive composition for rubber (B) | | Kneading number | Mooney viscosity | Mooney scorch time | Vulcanizing property T90 | Odor |
|---|---|---|---|---|---|---|---|---|---|
| | natural rubber parts by weight | SBR parts by weight | Kind | component (b) PHR* | | | | | |
| Example 28 | 100 | 0 | Production Example 1 | 2 | 3 | 92 | 98 | 97 | ○ |
| Example 29 | 100 | 0 | Production Example 2 | 2 | 3 | 91 | 98 | 98 | ○ |
| Example 30 | 100 | 0 | Production Example 3 | 2 | 3 | 92 | 97 | 99 | ○ |
| Example 31 | 100 | 0 | Production Example 4 | 2 | 3 | 92 | 96 | 97 | ○ |
| Example 32 | 100 | 0 | Production Example 4 | 5 | 3 | 87 | 94 | 93 | ○ |
| Example 33 | 100 | 0 | Production Example 5 | 2 | 3 | 94 | 98 | 99 | ○ |
| Example 34 | 100 | 0 | Production Example 6 | 2 | 3 | 92 | 95 | 96 | ○ |
| Example 35 | 100 | 0 | Production Example 7 | 2 | 3 | 92 | 94 | 94 | ○ |
| Example 36 | 100 | 0 | Production Example 8 | 2 | 3 | 93 | 95 | 95 | ○ |
| Example 37 | 100 | 0 | Production Example 9 | 2 | 3 | 95 | 98 | 99 | ○ |
| Example 38 | 100 | 0 | Production Example 10 | 2 | 3 | 91 | 93 | 95 | ○ |
| Example 39 | 50 | 50 | Production Example 4 | 2 | 3 | 93 | 96 | 98 | ○ |
| Example 40 | 50 | 50 | Production Example 10 | 2 | 3 | 93 | 95 | 99 | ○ |
| Example 41 | 100 | 0 | Production Example 4 | 0.5 | 3 | 98 | 100 | 99 | ○ |
| Example 42 | 100 | 0 | Production Example 4 | 2 | 3 | 88 | 101 | 102 | ○ |

Note)
*compounding amount by weight per 100 parts by weight of rubber ingredient As seen from the results in Table 7, the same results as in Examples 15–27 can be said to be obtained even in Examples 28–41 using the previously prepared additive composition for rubber (B) containing the component (b). And also, according to the invention, the reinforcing filler is not restricted to carbon black as seen from Example 42.

Examples 43–48, Comparative Examples 10–13

The uncured rubber compositions shown in Table 8 are selected from the rubber compositions shown in Tables 5 and 7, and cured at 145° C. for 33 minutes to obtain cured rubber samples. With respect to the thus obtained cured rubber samples, the tensile strength at break, elongation at break, rebound resilience, wear resistance and blooming are measured to obtain results as shown in Table 8. Comparative Example 11 is set to be control.

TABLE 8

| Cured rubber composition | No. of uncured rubber composition | Tensile strength at break | Elongation at break | Rebound resilience | Wear resistance | Blooming |
|---|---|---|---|---|---|---|
| Example 43 | Example 16 | 101 | 100 | 98 | 100 | ○ |
| Example 44 | Example 18 | 100 | 102 | 98 | 100 | ○ |
| Example 45 | Example 25 | 100 | 100 | 99 | 100 | ○ |
| Example 46 | Example 26 | 100 | 100 | 99 | 100 | ○ |
| Example 47 | Example 31 | 101 | 100 | 99 | 100 | ○ |
| Example 48 | Example 38 | 101 | 100 | 99 | 100 | ○ |
| Comparative Example 10 | Comparative Example 3 | 98 | 98 | 97 | 97 | ○ |
| Comparative Example 11 | Comparative Example 4 | 100 | 100 | 100 | 100 | ○ |
| Comparative Example 12 | Comparative Example 6 | 98 | 99 | 95 | 99 | X |
| Comparative Example 13 | Comparative Example 8 | 100 | 100 | 98 | 100 | X |

As seen from Examples 43–48, even if the kneading number is decreased, the properties of the cured rubber are not badly affected and the blooming problem is not caused.

However, the blooming is caused on the rubber surface in Comparative Examples 12 and 13 using no ester as defined in the invention.

As mentioned above, when the specified ester according to the invention is compounded with rubber component, even if the kneading number is decreased, the rubber properties are not substantially degraded over a period from all kneading steps to the production of rubber article.

By using the additive for a rubber composition and the additive composition for a rubber composition according to the invention, the processability of an uncured rubber composition is improved without degrading the properties of a cured rubber composition. In case of the rubber composition containing natural rubber, the productivity and processability are improved without decreasing the molecular weight of rubber and also the surface states of uncured and cured rubbers are stable without problems. The invention can be particularly applied to pneumatic tires.

What is claimed is:

1. An additive for a rubber composition consisting essentially of an ester selected from an ester of (i) an aliphatic polyvalent carboxylic acid with (iii) a (poly)oxyalkylene derivative, and having at least one carboxyl group in its molecule and represented by the following formula (I):

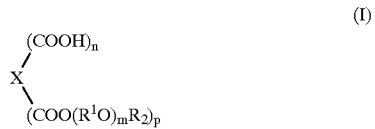

(I)

wherein m is a number of not less than 1 indicating an average degree of polymerization, and each of n and p is an integer of not less than 1, and X is a saturated or unsaturated aliphatic chain, and $R^1$ is an alkylene group and $R^2$ is a hydrocarbon group selected from the group consisting of alkyl group, an alkenyl group, an alkylaryl group and an acyl group, and an ester of (ii) an aromatic polyvalent carboxylic acid with (iii) a (poly)oxyalkylene derivative, and having at least one carboxyl group bonded to an aromatic ring in its molecule and represented by the following formula (II)

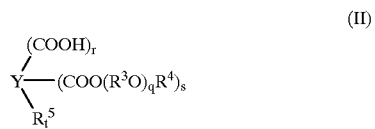

(II)

wherein q is a number of not less than 1 indicating an average degree of polymerization, and each of r and s is an integer of not less than 1, and t is 0 or an integer of not less than 1, and r+s+t is 6–8, and Y is an aromatic ring, and $R^3$ is an alkylene group, $R^4$ is a hydrocarbon group selected from the group consisting of an alkyl group, an alkenyl group and an alkylaryl group and $R^5$ is a hydrogen, an alkyl group or an alkenyl group.

2. An additive for a rubber composition according to claim 1, wherein in the formula (I), X is an aliphatic chain having an unsaturated bond, n=1, p=1, $R^1$ is an alkylene group having a carbon number of 2–4, and $R^2$ is an alkyl group or an alkenyl group having a carbon number of 2–28.

3. An additive for a rubber composition according to claim 2, wherein X is an aliphatic chain having an unsaturated bond and a carbon number of 2–8, and m is 1–10, and $R^1$ is an ethylene group or a propylene group, and $R^2$ is an alkyl group or an alkenyl group having a carbon number of 8–18.

4. An additive for a rubber composition according to claim 1, wherein in the formula (II), r+s is 2 or 3, and $R^3$ is an alkylene group having a carbon number of 2–4, and $R^4$ is an alkyl group or an alkenyl group having a carbon number of 2–28.

5. An additive for a rubber composition according to claim 4, wherein Y is a benzene ring, and r=1 and s=1, and $R^3$ is an ethylene group, and $R^4$ is an alkyl group or an alkenyl group having a carbon number of 2–28.

6. An additive for a rubber composition according to claim 5, wherein q is 1–10, r=1, s=1, $R^3$ is an ethylene group and $R^4$ is an alkyl group or an alkenyl group having a carbon number of 8–18.

7. An additive for a rubber composition according to claim 1, wherein the component (i) is a polyvalent aliphatic carboxylic acid or an anhydride thereof.

8. An additive for a rubber composition according to claim 1, wherein the component (ii) is a polyvalent aromatic carboxylic acid or an anhydride thereof.

9. An additive for a rubber composition according to claim 1, wherein the component (iii) is a component having (poly)oxyalkylene group with an average polymerization degree of not less than 1, and having one or more hydroxyl groups.

10. An additive composition for a rubber composition comprising (a) a reinforcing filler and (b) an ester selected from an ester of (i) an aliphatic polyvalent carboxylic acid with (iii) a (poly)oxyalkylene and having at least one carboxyl group in its molecule, and an ester of (ii) an aromatic polyvalent carboxylic acid with (iii) a (poly)oxyalkylene and having at least one carboxyl group bonded to an aromatic ring in its molecule, in which a compounding ratio by weight of the component (a) to the component (b) is 70/30 to 30/70.

11. An additive composition for a rubber composition according to claim 10, wherein said composition further contains at least one compound (c) selected from a (poly)oxyalkylene alcohol and its aliphatic acid ester, and an amount of the component (c) is not more than 10 parts by weight per 100 parts by weight in total of the components (a) and (b).

12. A rubber composition comprising a rubber ingredient and an ester selected from an ester of (i) an aliphatic polyvalent carboxylic acid with (iii) a (poly)oxyalkylene and having at least one carboxyl group in its molecule, and an ester of (ii) an aromatic polyvalent carboxylic acid with (iii) a (poly)oxyalkyene and having at least one carboxyl group bonded to an aromatic ring in its molecule.

13. A rubber composition according to claim 12, wherein said composition further contains a reinforcing filler.

14. A rubber composition comprising (A) a rubber ingredient and (B) an additive composition for a rubber composition consisting of (a) a reinforcing filler and (b) an ester selected from an ester of an aliphatic polyvalent carboxylic acid with a (poly)oxyalkylene and having at least one carboxyl group in its molecule and an ester of an aromatic polyvalent carboxylic acid with a (poly)oxyalkylene having at least one carboxyl group bonded to an aromatic ring in its molecule.

15. A rubber composition according to claim 14, wherein the additive composition (B) further contains at least one compound (c) selected from a (poly)oxyalkylene an alcohol and its aliphatic acid ester.

16. A pneumatic tire characterized by using a rubber composition as claimed in any one of claim 12.

17. A pneumatic tire characterized by using a rubber composition as claimed in claim 13.

18. A pneumatic tire characterized by using a rubber composition as claimed in claim 14.

19. A pneumatic tire characterized by using a rubber composition as claimed in claim 15.

* * * * *